United States Patent
Soda et al.

[11] Patent Number: 5,152,388
[45] Date of Patent: Oct. 6, 1992

[54] METHOD AND APPARATUS FOR CONTROLLING A CLUTCH FOR VEHICLES

[75] Inventors: Hiroyuki Soda; Hiromi Kohno; Masuhiro Otsuka, all of Higashimatsuyama, Japan

[73] Assignee: Zexel Corporation, Tokyo, Japan

[21] Appl. No.: 749,935

[22] Filed: Aug. 26, 1991

[30] Foreign Application Priority Data

Aug. 31, 1990 [JP] Japan .................................. 2-232052

[51] Int. Cl.⁵ ............................................. B60K 41/28
[52] U.S. Cl. ............................... 192/0.052; 192/0.092
[58] Field of Search ................. 192/0.052, 0.092, 3.63; 364/431.09

[56] References Cited

U.S. PATENT DOCUMENTS

4,965,730 10/1990 Kurihara et al. ............ 192/0.052 X
5,005,687 4/1991 Kurihara et al. ................. 192/0.073

Primary Examiner—Rodney H. Bonck
Attorney, Agent, or Firm—Pollock, Vande Sande & Priddy

[57] ABSTRACT

In a system for controlling a clutch for vehicle having an automatic gear-transmission control system, the clutch is controlled so as to be disengaged when a gear of the transmission is in a prescribed low-speed gear position at which strong engine braking power can be expected and fuel-powered operation of an engine for powering the vehicle has stopped during the running of the vehicle, whereby it can be prevented to apply sudden engine braking power to the vehicle.

7 Claims, 8 Drawing Sheets

METHOD AND APPARATUS FOR CONTROLLING A CLUTCH FOR VEHICLES

BACKGROUND OF THE INVENTION

1. Field of the Invention

The present invention relates to a method and apparatus for controlling a clutch for vehicles.

2. Description of the Prior Art

There is known a vehicular automatic transmission system in which gear-shifting operations of a gear transmission are automatically controlled by means of an electronic control system and the operation of the clutch is also controlled automatically in relation to the gear-shifting operations. In most conventional automatic systems, when fuel-powered operation of the engine stops because, for example, the ignition key has been turned off, control of the transmission and the like is discontinued while supply of electric power to the associated electronic control unit is maintained.

With this conventional arrangement, when fuel-powered operation of the engine stops because, for example, the ignition switch has been turned off, rotation of the engine will halt if the transmission is in the neutral position or the clutch is disengaged, even if the vehicle is running. This results in malfunctioning of the power steering system and the power braking system. To overcome these disadvantages, there has been proposed a control system in which the clutch is engaged after the transmission is shifted into a prescribed gear position other than the neutral position when fuel-powered operation of the vehicle engine stops in the case where the vehicle is running (see, for example, U.S. Pat. No. 5,005,687 and European Patent Application Public Disclosure No. 314409).

However, the proposed system operates so as to maintain the supply of the electric power to the control systems for the transmission and the clutch so as to carry out the aforesaid clutch and transmission control operations even after the ignition switch is turned off and fuel-powered operation of the engine stops. It follows, therefore, that engine braking power is applied to the vehicle when the clutch is engaged. This will cause sudden braking of the vehicle, which may be dangerous to the occupant(s).

SUMMARY OF THE INVENTION

It is an object of the present invention to provide an improved method and apparatus for controlling a vehicle clutch.

It is another object of the present invention to provide a method and an apparatus for controlling a vehicle clutch which is capable of controlling the clutch to prevent sudden braking from being applied to the vehicle by the engine during the vehicle running.

According to the present invention, in a vehicular clutch control system for automatically controlling a clutch installed between an internal combustion engine for powering the vehicle and a gear transmission whose gear shift operation is automatically controlled by a transmission controller, the clutch is coupled with an actuator for actuating the clutch and a control signal for controlling the engagement/disengagement of the clutch is produced by a control means in relation to the control operation of the gear transmission. The system further comprises a first discriminating means for discriminating whether or not the fuel-powered operation of the internal combustion engine has stopped, means for producing a position signal representing the gear position to which the gear transmission is shifted, and a second discriminating means responsive to the position signal for discriminating whether or not the transmission is shifted into a prescribed low-speed gear position or one of the prescribed low-speed gear positions. In the preferred embodiment, a first speed gear position, a second speed gear position and a reverse gear position are determined as the prescribed low speed gear positions. Other low-speed gear positions at which strong engine braking power can be expected may be additionally prescribed in view of, for example, the nature of the gear transmission.

The system is further provided with means responsive to the first and second discriminating means for controlling the actuator so as to disengage the clutch when it is discriminated that fuel-powered operation of the internal combustion engine has stopped in a case where the gear transmission has been shifted into a predetermined low-speed gear position.

As a result, when the vehicle is running with the gear transmission shifted into a prescribed low speed gear position, wherein excessive engine braking power may be applied to the vehicle, the clutch is disengaged to avoid the occurrence of sudden braking. On the other hand, the clutch is not disengaged when the transmission is shifted into a gear position other than a prescribed low-speed gear position. Therefore, prescribed hydraulic power can be supplied to the power steering system, the power braking system and the like so long as the vehicle is running.

The invention will by better understood and other objects and advantages thereof will be more apparent from the following detailed description of preferred embodiments with reference to the accompanying drawings.

DESCRIPTION OF THE PREFERRED EMBODIMENT

Figure 1:
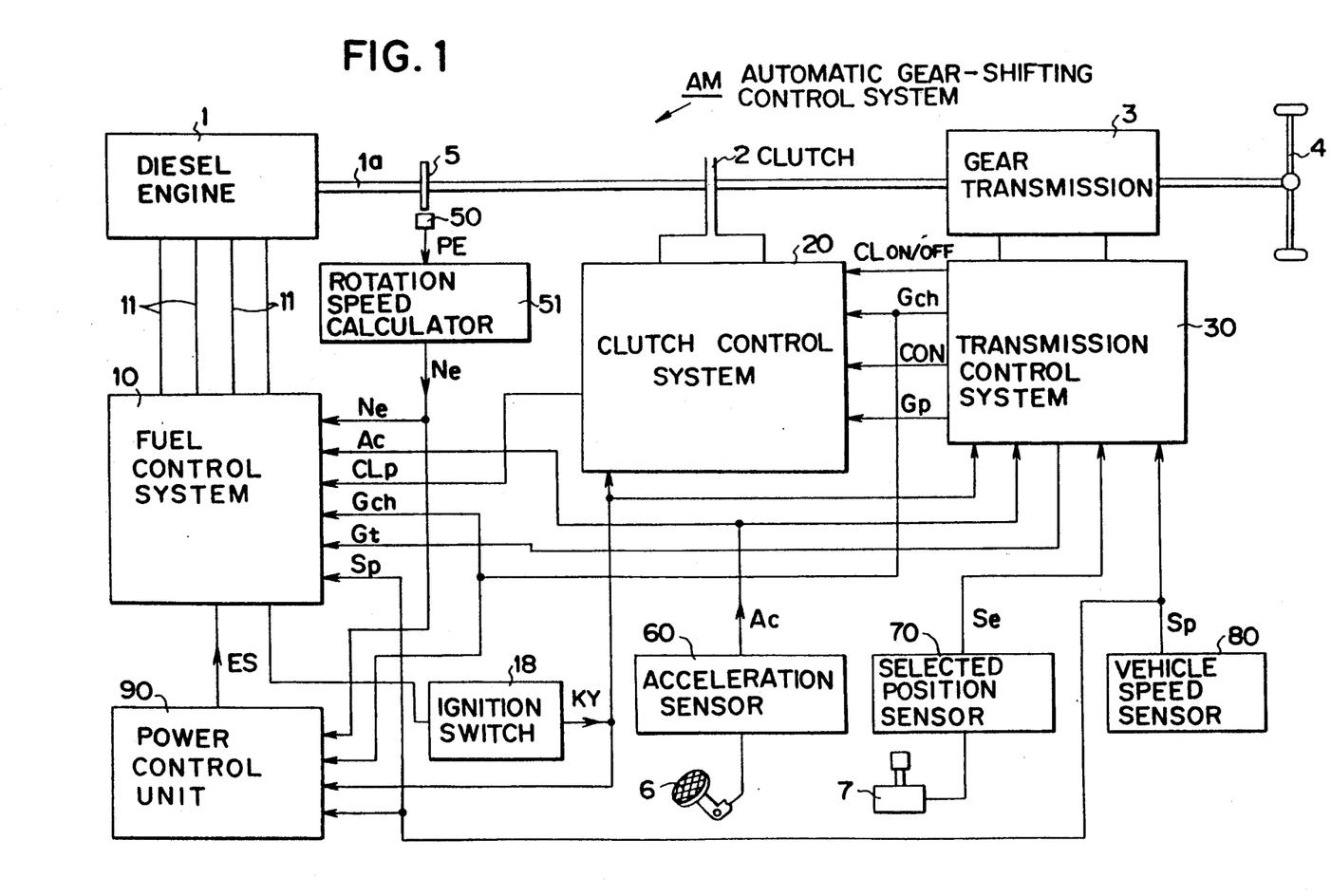
FIG. 1 is a block diagram showing an automatic gear-shifting control system using a clutch control system according to the present invention.

Referring to FIG. 1, a diesel engine 1 has an output shaft 1a coupled through a clutch 2 and a gear transmission 3 with a vehicular wheel shaft 4. The fuel to be supplied to the diesel engine 1 is electronically controlled by a fuel control system 10. The clutch 2 and gear transmission 3 are electronically controlled by a clutch control system 20 and a transmission control system 30. The systems 20 and 30 are part of an automatic gear-shifting control system AM which electronically controls the operations for automatic gear shifting.

A pulser 5 having a plurality of uniformly spaced cogs on its peripheral surface is mounted on the output shaft 1a and an electromagnetic pick-up element 50 is disposed so as to face the pulser 5, whereby a rotational speed sensor of well-known design is formed. The pick-up element 50 produces an electric signal PE whose frequency is proportional to the rotational speed of the pulser 5. A rotation speed calculator 51 responsive to the electric signal PE produces an engine speed signal Ne representing the rotational speed of the output shaft 1a, in the conventional manner.

The automatic gear-shifting control system AM further comprises an acceleration sensor 60 for detecting the amount of operation of an accelerator pedal 6 and producing an acceleration signal Ac, selected position sensor 70 for detecting the position selected by a selector 7 and producing a selected position signal Se, and a vehicle speed sensor 80 for generating a vehicle speed signal Sp indicating the running speed of the vehicle.

Figure 2:
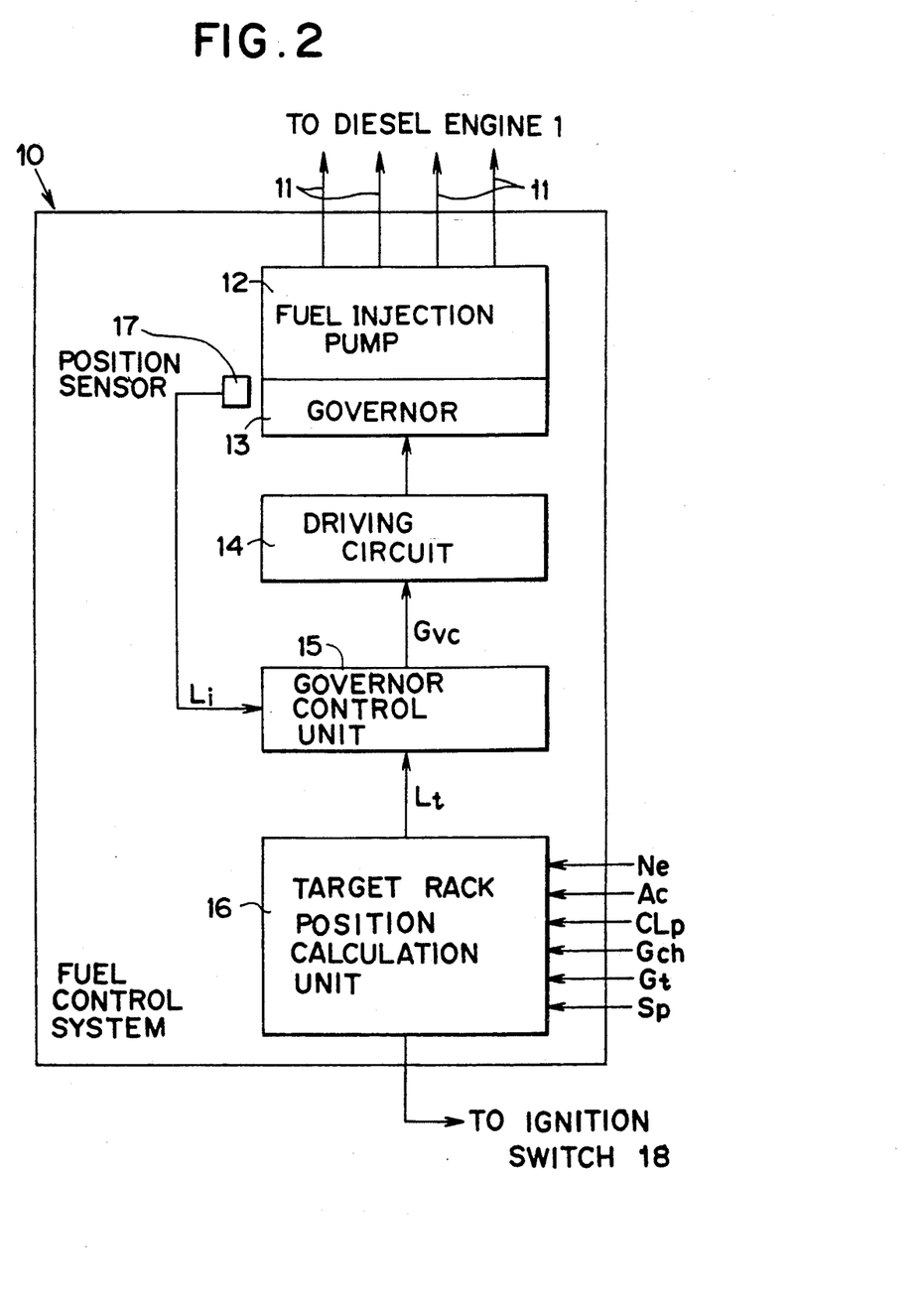
FIG. 2 is a detailed block diagram of the fuel control system shown in FIG. 1.

As illustrated in detail in FIG. 2, the fuel control system 10 has a fuel injection pump 12 coupled by pipes 11 with a fuel injection valve (not shown) mounted on the diesel engine 1. The fuel injection pump 12 has a control rack (not shown) for regulating the amount of fuel injected, and the position of the control rack is controlled by a governor 13. A driving circuit 14 for an actuator (not shown) incorporated into the governor 13 receives a governor control signal Gvc produced by a governor control unit 15. A PID calculation is carried out in the governor control unit 15 to produce the governor control signal Gvc on the basis of the difference between a target rack position signal Lt produced by a target rack position calculation unit 16 and an actual rack position signal Li produced by a position sensor 17 coupled with the control rack by a link mechanism (not shown).

Figure 5:
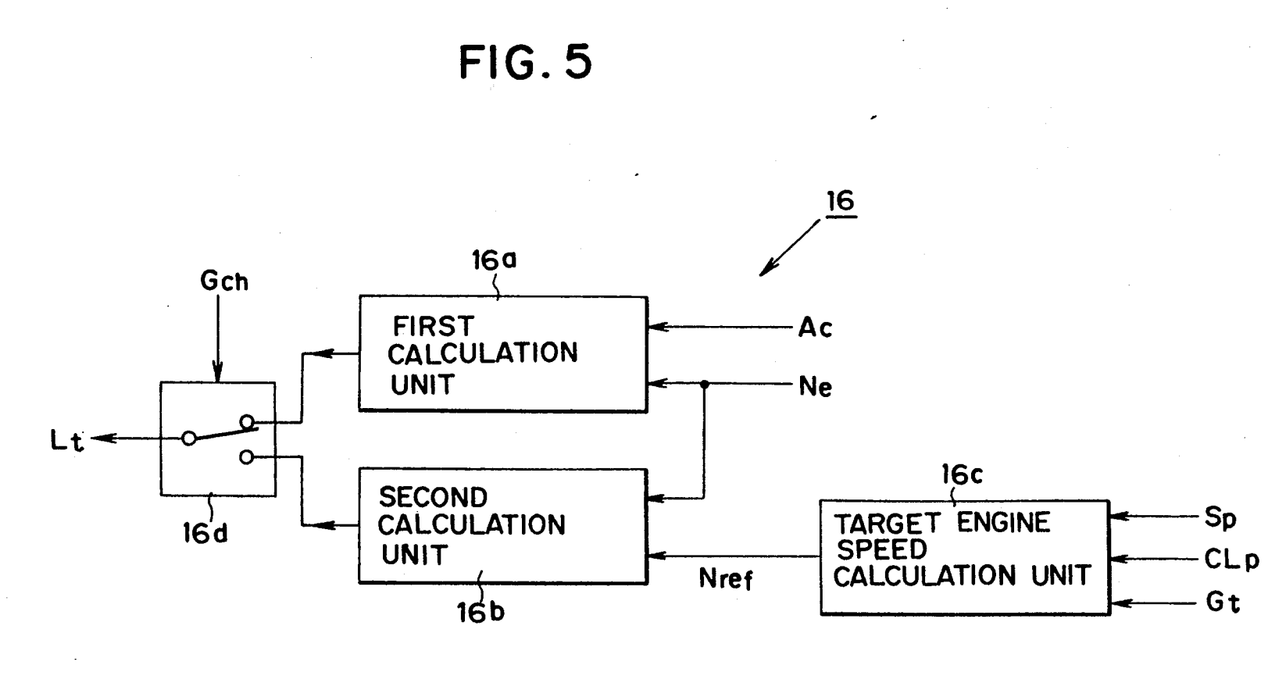
FIG. 5 is a detailed block diagram of the target rack position calculation unit shown in FIG. 2.

As shown in FIG. 5, the target rack position calculation unit 16 has a first calculation unit 16a and a second calculation unit 16b. The first calculation unit 16a calculates an optimum amount of fuel injection on the basis of the acceleration signal Ac and the engine speed signal Ne, and further calculates the target rack position necessary for obtaining the optimum amount of fuel injection. The second calculation unit 16b carries out a PID calculation for determining the target rack position on the basis of the difference between the engine speed signal Ne and a target engine speed signal Nref generated by a target engine speed calculation unit 16c.

The target engine speed signal Nref is produced by the target engine speed calculation unit 16c on the basis of an actual clutch position signal CLp and a target gear position signal Gt, which will be described later, in addition to the vehicle speed signal Sp.

A switch 16d is connected with the output lines of the first calculation unit 16a and the second calculation unit 16b. The switch 16d is controlled by a gear-change signal Gch produced by the transmission control system 30 as described later, and the result of the calculation obtained by the first calculating unit 16a is selected by the switch 16c as the target rack position signal Lt when the gear-change signal Gch does not indicate that a gear change operation is being carried out. As a result, the position of the control rack is controlled by the governor control unit 15 in order to realize the target rack position determined by the first calculation unit 16a, and the optimum amount of fuel injected for the amount of operation of the accelerator pedal 6 and the engine speed is determined.

On the other hand, when the gear-change signal Gch indicates that a gear-change operation is being carried out, the switch 16c is switched over to select the output signal from the second calculation unit 16b and the output signal of the second calculation unit 16b is selected as the target rack position signal Lt. Thus, the position of the control rack is controlled irrespective of the amount of operation of the accelerator pedal 6, whereby a temporary excessive increase in engine speed can be prevented.

Returning to FIG. 1, the ON/OFF control operation of the power supply to the fuel control system 10 and other control systems is carried out in response to a power control signal ES produced by a power control unit 90. Specifically, the power is supplied thereto when the level of the power control signal ES is high, and the supply of power is stopped when the level of the power control signal ES is low.

Figure 6:
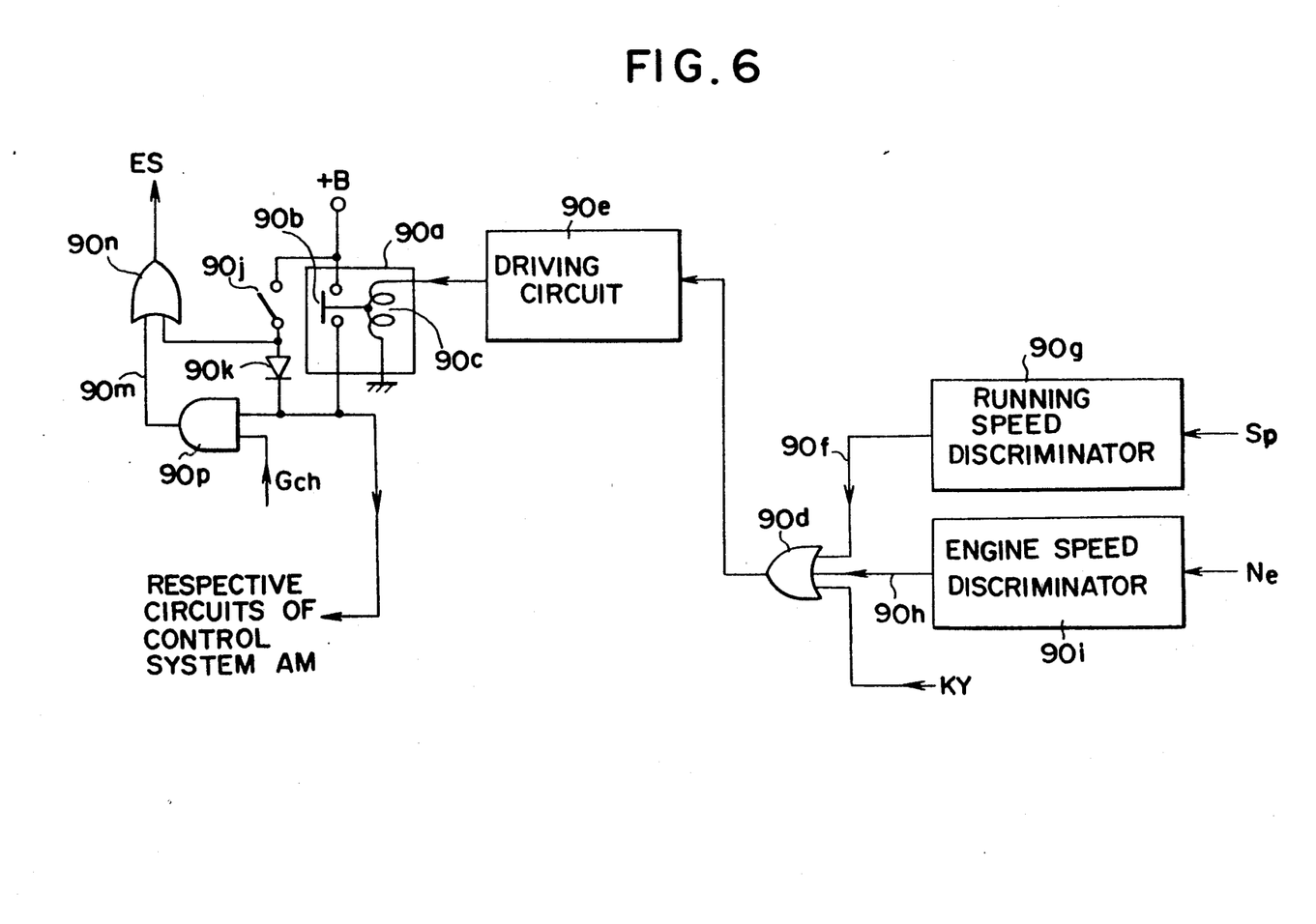
FIG. 6 is a schematic diagram of the power control unit shown in FIG. 1.

As illustrated in FIG. 6, the power control unit 90 has a relay 90a installed between the respective circuits of the automatic gear-shifting control system AM and the power supply +B. One terminal of a relay switch 90b of the relay 90a is connected with the power supply +B and the other terminal thereof is connected with the respective circuits of the automatic gear-shifting control system AM. A relay coil 90c associated with the relay switch 90a is controlled by a driving circuit 90e which receives the output signal of an OR circuit 90d. On the input side of the OR circuit 90d, there are installed a running speed discriminator 90g and an engine speed discriminator 90i. The former detects whether or not the vehicle is running in response to the vehicle speed signal Sp, and has an output line 90f on which a high level signal appears when it detects that the vehicle is running. The latter is responsive to the engine speed signal Ne and has an output line 90h on which a high level signal appears when the engine speed is not zero. Each of the output lines 90f and 90h is connected with an input terminal of the OR circuit 90d having another input terminal to which an ignition switch signal KY produced by an ignition switch 18 (FIG. 1) is applied.

The level of the ignition switch signal KY becomes low only when the ignition switch 18 is turned to its OFF position, and becomes high when the ignition switch 18 is in a position other than the OFF position.

Accordingly, when the ignition switch 18 is OFF, the output level of the OR circuit 90d becomes low only when both the vehicle speed and the engine speed are zero. The relay coil 90c is energized by the driving circuit 90e to close the relay switch 90b only when the output level of the OR circuit 90d has become high.

A serial circuit consisting of a switch 90j and a diode 90k is connected in parallel with the relay switch 90b. The switch 90j is arranged to operate in response to the ignition switch 18 in such a manner that it opens when the ignition switch 18 is in the OFF position and closes when the ignition switch 18 in the ON position. The diode 90k is provided in the direction enabling current flow from the power supply +B to the respective circuits of the control system AM. The cathode electrode of the diode 90k is connected with one input terminal of an AND circuit 90p having another input terminal to which the gear-change signal Gch is applied. The output line 90m of the AND circuit 90p is connected with one input terminal of an OR circuit 90n having another input terminal to which the voltage appearing at the connecting point of the diode 90k and the switch 90j is applied. Thus, the engine control signal ES is derived from the OR circuit 90n.

Accordingly, whenever the ignition switch 18 is in the ON position, the level of the power control signal ES is high, and electric power is supplied to the fuel control system 10 and the respective portions of the control system AM. On the other hand, the relay switch 90b is closed so long as at least one of the vehicle speed and the engine speed is not zero, even if the ignition switch 18 is turned off, whereby the required electric power is supplied to the respective portions of the control system AM.

In this case, the level of the gear-change signal Gch is high if a gear shift operation is being carried out, so that the output level of the AND circuit 90p is high. Consequently, even if the ignition switch 18 is turned off, the supply of power to the fuel control system 10 is maintained so long as the gear shifting operation is being carried out while electric power is supplied through the relay switch 90b to the respective portions of the control system AM.

Figure 3:
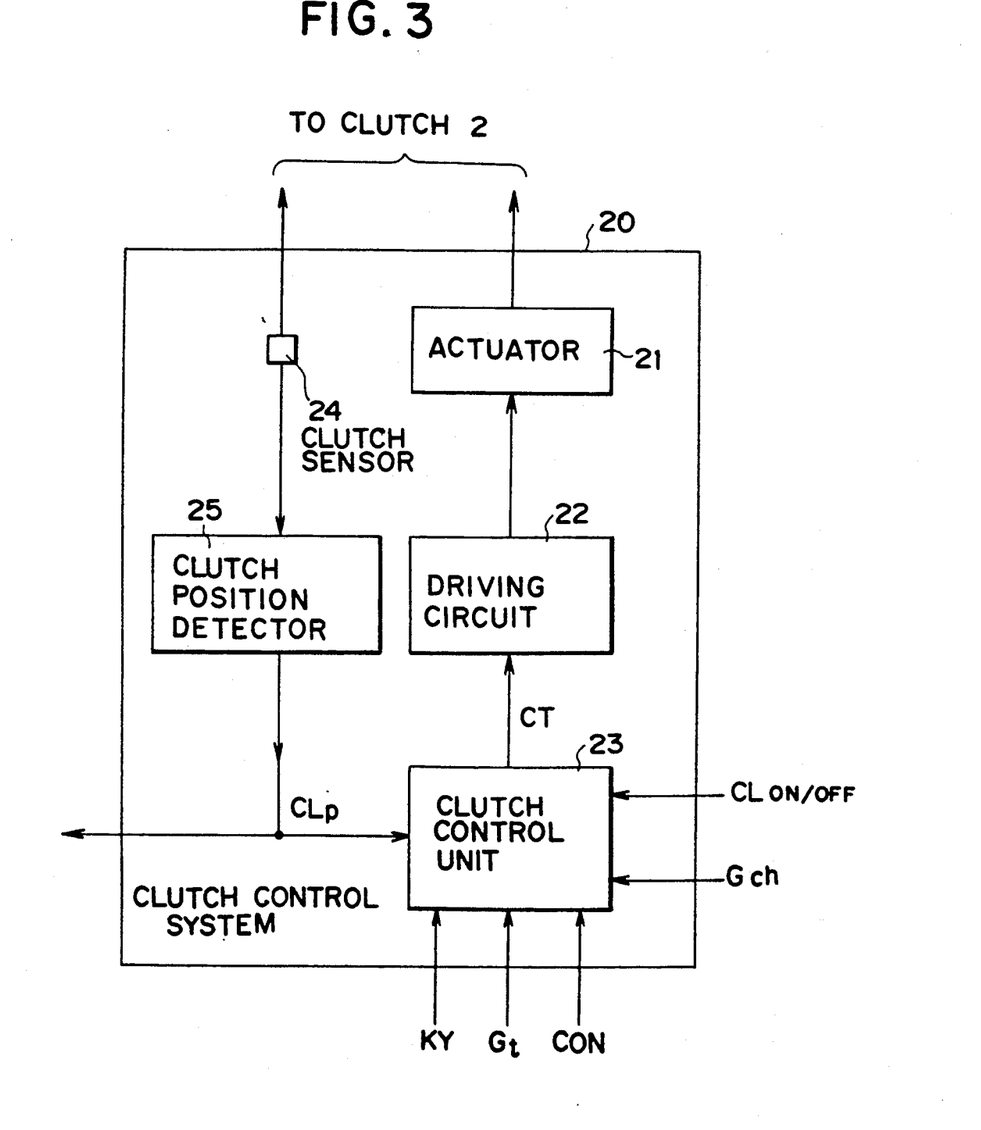
FIG. 3 is a detailed block diagram of the clutch control system shown in FIG. 1.

Referring to FIG. 3, the clutch control system 20 comprises an actuator 21, a clutch control unit 23 for providing a clutch control signal CT to a driving circuit 22 for driving the actuator 21, a clutch sensor 24 for detecting the position of a pressure plate (not shown) of the clutch 2 as a clutch position, and a clutch position detector 25 for producing an actual clutch position signal CLp indicating the actual clutch position in response to the output of the clutch sensor 24.

Figure 7:
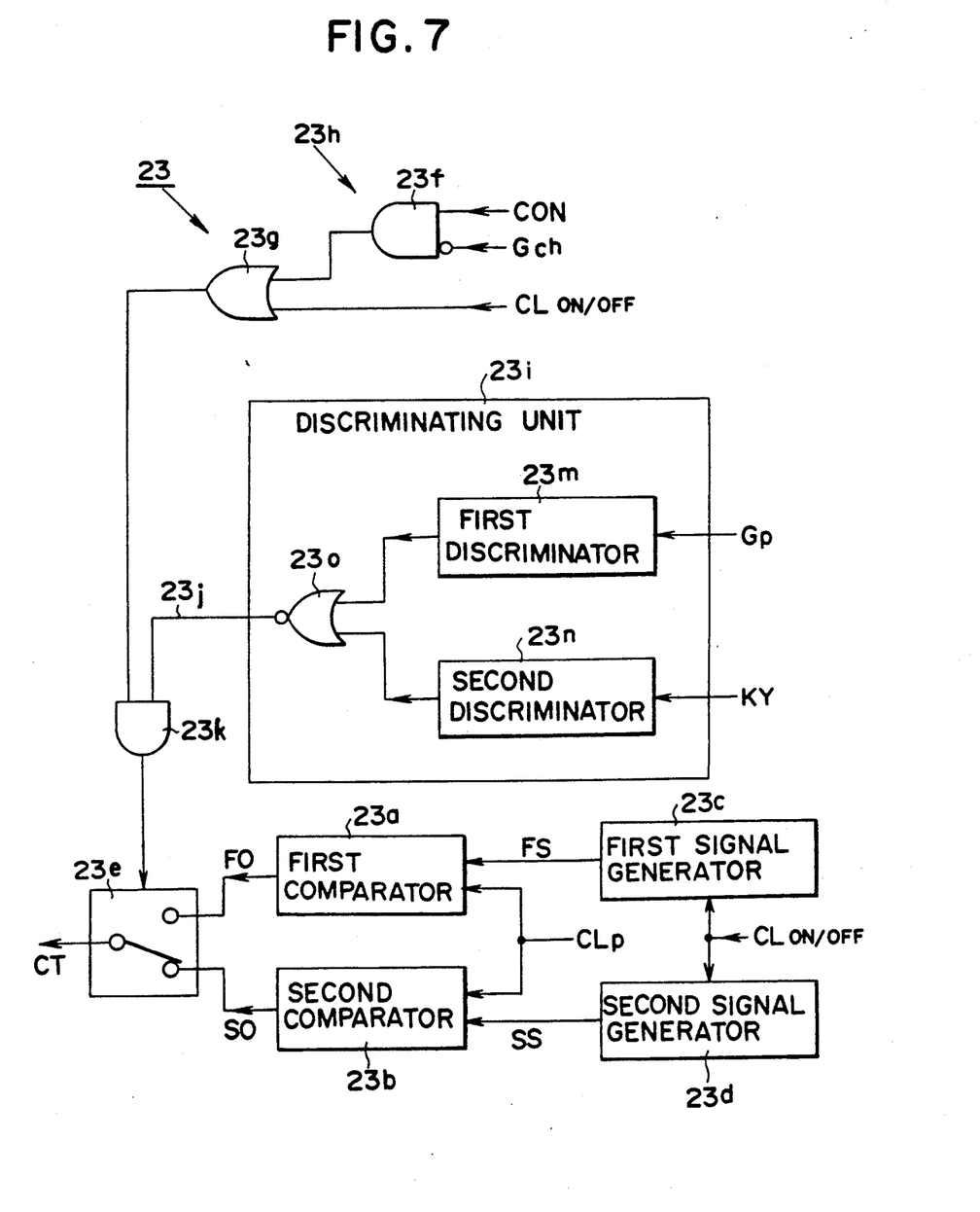
FIG. 7 is a schematic diagram of the clutch control unit shown in FIG. 3.

As illustrated in FIG. 7, the clutch control unit 23 has a first comparator 23a and a second comparator 23b.

A first signal generator 23c responsive to a clutch ON/OFF signal $CL_{ON/OFF}$ produces a first signal FS representing the time-course pattern of the clutch position for engaging the clutch 2. A second signal generator 23d, also responsive to the clutch ON/OFF signal $CL_{ON/OFF}$, produces a second signal SS representing the time-course pattern of the clutch position for engaging the clutch 2. The first comparator 23a compares the actual clutch position signal CLp with the first signal FS, which is produced when the start of the clutch engaging operation is commanded by the clutch ON/OFF signal $CL_{ON/OFF}$ and the first comparator 23a produces a first output FO for controlling the clutch position so as to reduce the difference therebetween, whereby the clutch 2 is engaged in accordance with the time-course pattern indicated by the first signal FS. The second comparator 23b compares the actual clutch position signal CLp with the second signal SS, which is produced when the start of the clutch disengaging operation is commanded by the clutch ON/OFF signal $CL_{ON/OFF}$, and the second comparator 23b produces a second output SO for controlling the clutch position so as to reduce the difference therebetween, whereby the clutch 2 is disengaged in accordance with the time-course pattern indicated by the second signal SS.

A switch 23e is connected with the output lines of the first and the second comparator 23a and 23b for enabling selection of one of the first and second outputs FO and SO. The switch 23e is controlled in the following way. A control signal CON produced by a target gear position calculation unit 34, to be described later, is applied to one input terminal of an AND circuit 23f having another input terminal to which the gear-change signal Gch is applied. One input terminal of an OR circuit 23g receives the output signal of the AND circuit 23f and another input terminal of the OR circuit 23g receives the clutch ON/OFF signal $CL_{ON/OFF}$.

The output terminal of the OR circuit 23g is connected with one input terminal of an AND circuit 23k having another input terminal to which an output line 23j of a discriminating unit 23i is connected, and the ON/OFF operation of the switch 23e is controlled in accordance with the output from the AND circuit 23k. In the embodiment shown in FIG. 7, the switch 23e is arranged to select the first output FO when the output level of the AND circuit 23k is high and to select the second output SO when it is low.

The discriminating unit 23i comprises a first discriminator 23m and a second discriminator 23n. The first discriminator 23m is responsive to an actual gear position signal Gp produced by a gear position sensor 35, which will by described later, and discriminates whether or not the gear transmission 3 has shifted into one of the predetermined low-speed gear positions. While in this embodiment the first speed, second speed and reverse gear positions are defined as the predetermined low-speed gear positions, it suffices to define a minimum of one gear position as a predetermined low-speed gear positions. The level of the output of the first discriminator 23m is high when the result of the discrimination is that the transmission is in one of the first speed, second speed and reverse gear positions, and the level thereof is low when the result of the discrimination is that the gear position is one other than a predetermined gear position. The second discriminator 23n is responsive to the ignition switch signal KY and is arranged to produce a high level output when the ignition switch 18 is in the OFF position and to produce a low level output when the ignition switch 18 is in a position other than the OFF position.

The output signals of the first and second discriminators 23m and 23n are applied to respective input terminals of a NOR circuit 23o.

Therefore, the level of the output line of the NOR circuit 23o is low only when the ignition switch 18 is in the OFF position and the gear transmission 3 is shifted into one of the predetermined low speed gear positions, that is, one of the first speed, second speed and reverse gear positions. The level of the output line 23j is high in cases other than the foregoing.

Accordingly, in the case where the ignition switch 18 is in the OFF position and the gear transmission 3 is shifted into one of the first speed, second speed and reverse gear positions, the clutch 2 is always in the disengaged state irrespective of the output level of the OR circuit 23g. On the other hand, since the level of the output line 23j is high when the ignition switch 18 is in the ON or ST position, or the gear transmission 3 is shifted into a position other than the first speed, second speed and reverse gear positions, the control operation for engaging/disengaging the clutch 2 is carried out depending upon the output level of the OR circuit 23g.

That is, in the case where the level of the control signal CON is low, the first output FO is applied through the switch 23e to the driving circuit 22 to engage the clutch 2 when the level of the clutch ON/OFF signal $CL_{ON/OFF}$ is high, and the second output So is applied through the switch 23e to the driving circuit 22 to disengage the clutch 2 when the level of the clutch ON/OFF signal $CL_{ON/OFF}$ is low.

Figure 4:
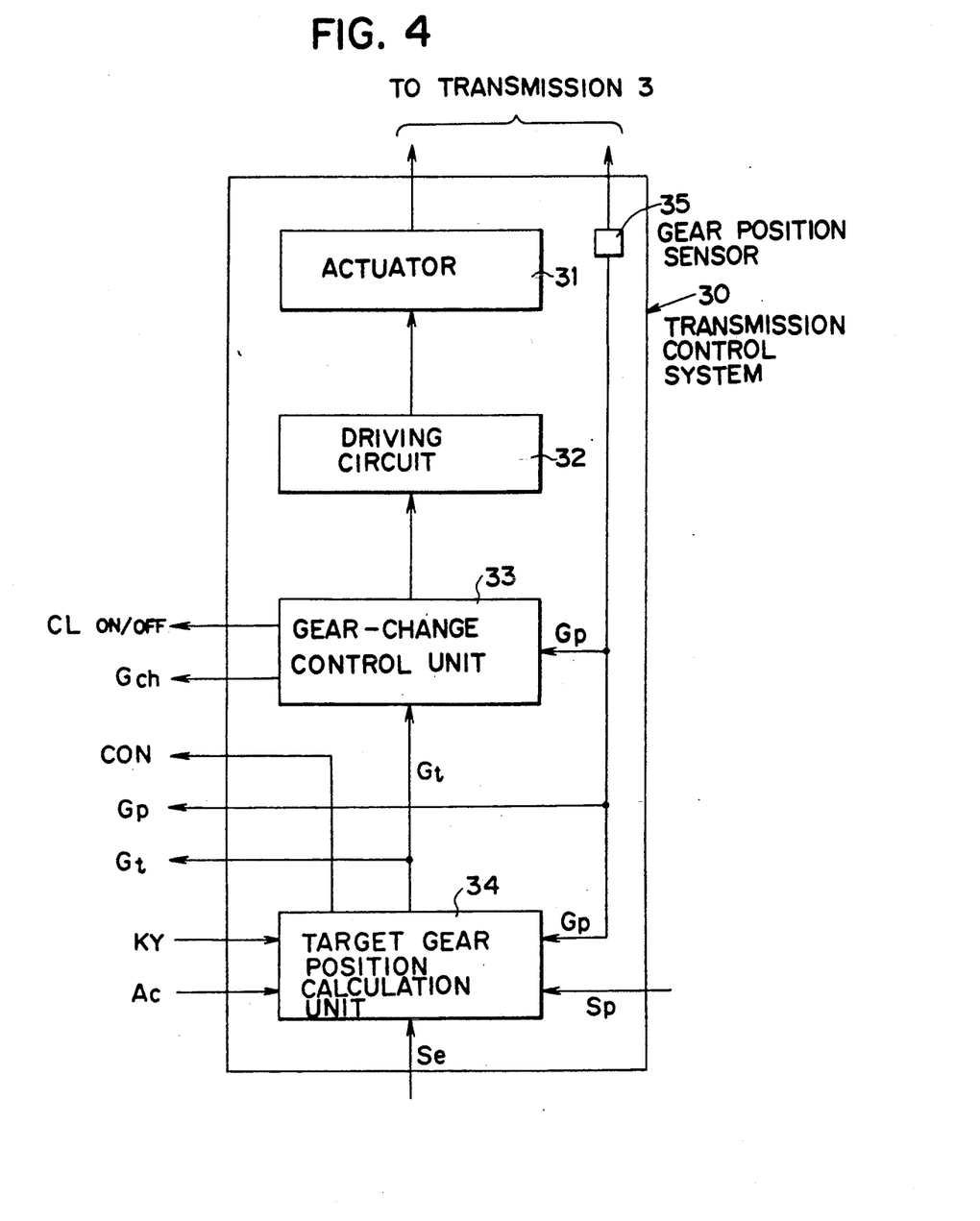
FIG. 4 is a detailed block diagram of the transmission control system shown in FIG. 1.

Referring to FIG. 4, the transmission control system 30 has an actuator 31, a gear-change control unit 33 for supplying a control signal to a driving unit 32 associated with the actuator 31, the target gear position calculation unit 34 for producing the target gear position signal Gt which is sent to the gear-change control unit 33, and the gear position sensor 35 for producing the actual gear position signal Gp indicating the actual gear position of the gear transmission 3. The gear-change control unit 33 compares the target gear position signal Gt with the actual gear position signal Gp and controls the actuator 31 in accordance with the result, whereby the transmission 3 is shifted into the target gear position. In conjunction with gear shift operations, the gear-change control unit 33 produces the clutch ON/OFF signal $CL_{ON/OFF}$ for commanding the engaging/disengaging operation of the clutch 2 and the gear-change signal Gch indicating that a gear-shifting operation is being carried out in the transmission 3. Both signals are sent to the clutch control unit 23.

Figure 8:
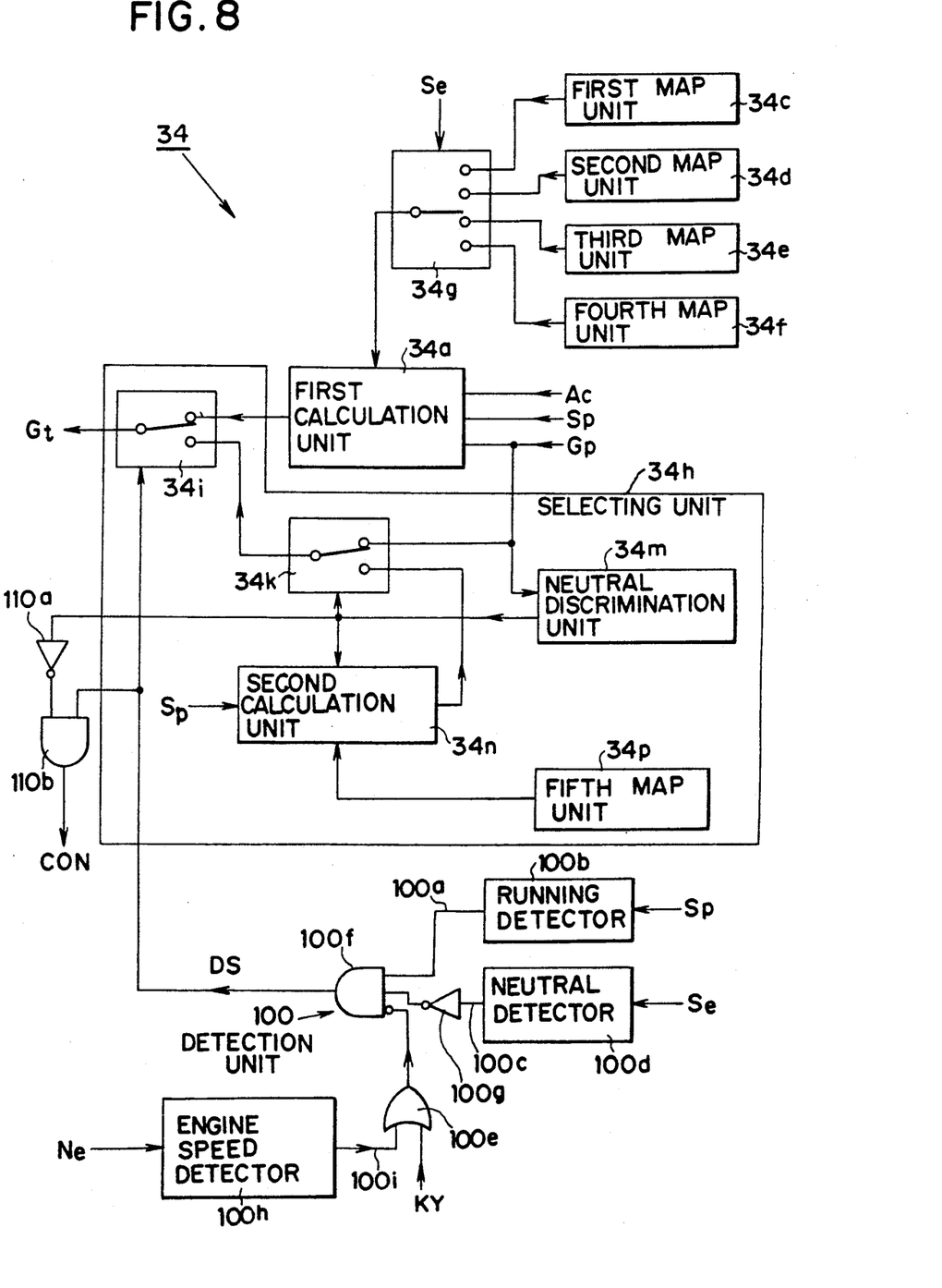
FIG. 8 is a schematic diagram of the target gear position calculation unit shown in FIG. 4.

As illustrated in FIG. 8, the target gear position calculation unit 34 has a first calculation unit 34a to which the acceleration signal Ac, the vehicle speed signal Sp and the actual gear position signal Gp are applied. The target gear position calculation unit 24 is also provided with a first map unit 34c for supplying map data for a drive range selected by the selector 7, a second map unit 34d for supplying map data for a fourth range selected by the selector 7, a third map unit 34e for supplying map data for a third range selected by the selector 7, and a fourth map unit 34f for supplying map data for a second range selected by the selector 7, one of which is connected with the first calculation unit 34a by a switch 34g in response to the selected position signal Se. As a result, appropriate map data for the selector position selected by the selector 7 is supplied through the switch 34g to the first calculating unit 34a and the optimum gear position for the acceleration signal Ac and the vehicle speed signal Sp is calculated in accordance with the map data supplied from the selected map unit. Then, the resulting optimum gear position is compared with the actual gear position, and the target gear position is determined on the basis of the result.

The target gear position calculation unit 34 further comprises a selecting unit 34h having switches 34i and 34k, a neutral discrimination unit 34m, a second calculation unit 34n, and a fifth map unit 34p. The neutral discrimination unit 34m is for discriminating in response to the actual gear position signal Gp whether or not the transmission 3 is shifted into the neutral position. In the case where the neutral discrimination unit 34m determines that the transmission 3 is shifted into the neutral position, the target gear position for the case where the vehicle is running with fuel-powered operation of the engine stopped is calculated in advance by the second calculation unit 34n on the basis of the vehicle speed signal Sp and the map data supplied from the fifth map unit 34p. The switch 34i is controlled by a discrimination signal DS supplied from a detection unit 100.

The detection unit 100 is for detecting whether or not the vehicle is running with fuel-powered operation of the engine 1 stopped and the transmission 3 in the neutral position. Accordingly, the detection unit 100 comprises a running detector 100b responsive to the vehicle speed signal Sp for discriminating whether or not the vehicle is running, and a neutral detector unit 100d responsive to the selected position signal Se for discriminating whether or not the neutral range is selected by the selector 7. The running detector 100b generates a high level signal on its output line 100a when the vehicle is running, and the neutral detector 100d generates a high level signal on its output line 100c when the neutral range is selected by the selector 7.

The output line 100a is connected with an input terminal of an AND circuit 100f having another input terminal to which the output line 100c is connected through an invertor 100g. The ignition switch signal KY is applied through an OR circuit 100e to an inverting input terminal of the AND circuit 100f and one input terminal of the OR circuit 100e is connected to the output line 100i of an engine speed detector 100h, which is responsive to the engine speed signal Ne and discriminates whether or not the rotational speed of the engine 1 is zero. The engine speed detector 100h is arranged to generate a high level signal on the output line 100i when the rotational speed of the engine 1 is not zero. As a result, the OR circuit 100e produces a low level signal when the zero engine speed condition is detected by the engine speed detector 100h and the ignition switch 18 is in the OFF position.

Accordingly, the level of the discrimination signal DS is high when the engine speed is zero and the ignition switch 18 is turned off in the case where the vehicle is running with the transmission 3 shifted into the neutral position. In contrast, the level of the discrimination signal DS is low in cases other than the foregoing. In addition, the detection unit 100 may be arranged to have the OR circuit 100e receive only one of the ignition switch signal KY and the output signal from the engine speed detector 100b.

The switch 34i is arranged to select the output signal from the first calculation unit 34a when the level of the discrimination signal DS is low, and this selected output signal is derived as the target gear position signal Gt from the switch 34i. On the other hand, the output signal of the switch 34k is selected as the target gear position signal Gt by the switch 34i when the level of the discrimination signal is high. The switch 34k is switched over as illustrated in FIG. 8 when a neutral output signal indicating that the transmission 3 is shifted into the neutral position is not received from the neutral discrimination unit 34m, so that the actual gear position signal Gp is output as the target position signal Gt. As a result, the gear shift position of the transmission 3 is maintained as it is when the vehicle is running with the ignition switch 18 turned off.

When the level of the discrimination signal DS becomes high in the case where the switch 34k receives the neutral output signal from the neutral discrimination unit 34m, the output of the second calculation unit 34n is selected as the target gear position signal Gt. Therefore, even if the transmission 3 is shifted into the neutral position when the ignition switch 18 is off, the transmission 3 is shifted into a position suitable for the vehicle running speed on the basis of the map data according to the fifth map unit 34p.

The discrimination signal DS is applied to an input terminal of an AND circuit 110b having another input terminal to which the neutral output signal from the neutral discrimination unit 34m is applied through an inventor 110a. Consequently, the AND circuit 110b outputs a control signal CON whose level is high only when the level of the discrimination signal DS is high and the actual position of the gear of the transmission 3 is a position other than the neutral position.

The control signal CON is applied to the AND circuit 23f in the clutch control unit 23 (See FIG. 7). Since the output level of the AND circuit 23f is not changed to low so long as the gear change signal Gch is applied thereto, even if the control signal CON is supplied, the disengaged state of the clutch 2 is maintained. The output level of the AND circuit 23f is changed to high at the time the production of the gear change signal Gch stops, so that the switch 23e is changed over. As a result, the first output FO is sent to the driving circuit 22 as the clutch control signal CT and the clutch 2 is disengaged.

As will be understood from the foregoing description, when it is discriminated by the detection unit 100 that the ignition switch 18 is turned off when the vehicle is running with the transmission shifted into a position other than the neutral position, the signal produced by the selecting unit 34h is sent as the target gear position signal Gt to the gear-change control unit 33, and the gear shift operation is carried out in response thereto. When the foregoing discrimination result is obtained by the detection unit 100 in the case where the transmission 3 is shifted into a position other than the neutral position, the level of the control signal CON is changed to high. Thus, the clutch control unit 23 produces a clutch control signal CT for engaging the clutch 2 when the level of the gear-change signal Gch is changed to low.

That is, when turning-off òf the ignition switch 18 causes fuel-powered operation of the engine 1 to stop in the case where the vehicle is running with the transmission 3 shifted into a position other than the neutral position, the transmission 3 is always shifted into an appropriate position other than the neutral position and the clutch 2 is engaged. As a result, the rotation of the wheel shaft 4 can be transmitted through the transmission 3 and the clutch 2 to the engine 1, so that it is possible to maintain the operability of the power steering system, the power braking system and the like, whereby appropriate braking power can be applied to the vehicle when necessary and the smooth steering can be ensured until the vehicle stops.

Even in this case, since the clutch 2 is disengaged when the ignition switch 18 is changed over to the OFF position in the case where the transmission 3 is shifted into the first or second gear position, sudden application of large braking power to the vehicle is effectively prevented at that time.

If the ignition switch 18 is turned off in the case where the transmission 3 is shifted into a position higher than second speed gear, the engaged state of the clutch 2 is maintained to keep the diesel engine 1 rotating owing to the running of the vehicle, whereby appropriate engine breaking power can be applied to the vehicle.

The present invention has been described by way of one embodiment, but the present invention is not limited to the arrangement of the foregoing embodiment. For example, the same constitution as that of the embodiment can be realized by the use of a microcomputer arranged to execute an appropriate control program.

What is claimed is:

1. An apparatus for automatically controlling a clutch installed between an internal combustion engine for powering a vehicle and a gear transmission whose gear shift operation is automatically controlled by a transmission control system, in relation to the control operation of said gear transmission, said apparatus comprising:

a position sensor for producing a position signal indicating a gear position to which said gear transmission is shifted;

a first means for discriminating whether or not fuel-powered operation of said engine has stopped;

a second means responsive to said position signal for discriminating whether or not said gear transmission is shifted into a prescribed low-speed gear position;

a producing means for producing either a first clutch signal for engaging said clutch or a second clutch signal for disengaging said clutch as a clutch control signal in response to a request received from said transmission control system;

an actuator which is coupled with said clutch to activate the same in accordance with the clutch control signal; and a means responsive to said first and second means for controlling said producing means so as to produce said second clutch signal, irrespective of the request from the transmission control system, when it is detected that fuel-powered operation of said engine has stopped in the case where said gear transmission has been shifted into the prescribed low-speed gear position.

2. An apparatus as claimed in claim 1, wherein said first means is arranged to discriminate whether or not the fuel-powered operation has stopped by detecting an operation position of an ignition switch.

3. An apparatus as claimed in claim 1, wherein said producing means has a first signal generator for generating a first pattern signal indicating a first target time-course pattern for engaging said clutch and the first clutch signal is produced on the basis of the first pattern signal.

4. An apparatus as claimed in claim 3, wherein said producing means has a second signal generator for generating a second pattern signal indicating a second target time-course pattern for disengaging said clutch and the second clutch signal is produced on the basis of the second pattern signal.

5. An apparatus for automatically controlling a clutch installed between an internal combustion engine which powers a vehicle and has an ignition switch for controlling an engine ignition system and a gear transmission whose gear shift operation is automatically controlled by a transmission control system, in relation to the control operation of said gear transmission, said apparatus comprising:

an actuator which is coupled with said clutch to actuate the same;

a position sensor for producing a position signal indicating a gear position to which said gear transmission is shifted;

a first means for discriminating whether or not the ignition switch is turned to its OFF position;

a second means responsive to said position signal for discriminating whether or not said gear transmission is shifted into a prescribed low-speed gear position; and a control means responsive to said first and second means for controlling said actuator so as to disengage said clutch when it is detected that the ignition switch is in the OFF position and said gear transmission has been shifted into the prescribed low-speed gear position.

6. A method for controlling a clutch installed between an internal combustion engine which powers a vehicle and has an ignition switch for controlling an engine ignition system and a gear transmission whose gear shift operation is automatically controlled by a transmission control system, said method comprising the steps of:

discriminating whether or not fuel-powered operation of the internal combustion engine has stopped;

discriminating whether or not the gear transmission is shifted into a predetermined low-speed gear position at which strong engine braking power can be expected;

detecting a running speed of the vehicle; and disengaging the clutch when the gear transmission is in the predetermined low-speed gear position and the fuel-powered operation of the internal combustion engine has stopped during the running of the vehicle.

7. A method as claimed in claim 6, wherein the discrimination of whether or not fuel-powered operation of the internal combustion engine has stopped is determined on the basis of an operation position of the ignition switch.

* * * * *